United States Patent
Frisch et al.

(10) Patent No.: US 10,338,887 B2
(45) Date of Patent: Jul. 2, 2019

(54) METHOD FOR SELECTIVE CALIBRATION OF VEHICLE SAFETY SYSTEMS IN RESPONSE TO VEHICLE ALIGNMENT CHANGES

(71) Applicant: Hunter Engineering Company, St. Louis, MO (US)

(72) Inventors: Ryan J. Frisch, St. Louis, MO (US); Blackford F. Brauer, St. Louis, MO (US)

(73) Assignee: Hunter Engineering Company, St. Louis, MO (US)

( * ) Notice: Subject to any disclaimer, the term of this patent is extended or adjusted under 35 U.S.C. 154(b) by 141 days.

(21) Appl. No.: 15/690,021

(22) Filed: Aug. 29, 2017

(65) Prior Publication Data

US 2018/0060036 A1    Mar. 1, 2018

Related U.S. Application Data

(60) Provisional application No. 62/381,835, filed on Aug. 31, 2016.

(51) Int. Cl.
*G01B 21/26* (2006.01)
*G06Q 10/00* (2012.01)
*G06F 7/02* (2006.01)

(52) U.S. Cl.
CPC ............ *G06F 7/023* (2013.01); *G01B 21/26* (2013.01); *G06Q 10/20* (2013.01); *G01B 2210/26* (2013.01)

(58) Field of Classification Search
CPC ..... G01B 21/26; G01B 2210/26; G06Q 10/20
See application file for complete search history.

(56) References Cited

U.S. PATENT DOCUMENTS

| 7,337,650 B1 | 3/2008 | Preston et al. |
| 2015/0178663 A1* | 6/2015 | Colarelli, III .... G06Q 10/06398 705/7.39 |

* cited by examiner

*Primary Examiner* — Todd M Melton
(74) *Attorney, Agent, or Firm* — Sandberg Phoenix & von Gontard PC (57) ABSTRACT

A vehicle service system configured to modify an ongoing vehicle service procedure in response to changes in vehicle wheel alignment angles which alter the vehicle tracking, thrust line, or thrust angle, in a manner which will affect the operation of an onboard vehicle safety system sensor which is aligned or calibrated relative to a selected characteristic of the vehicle.

14 Claims, 8 Drawing Sheets

METHOD FOR SELECTIVE CALIBRATION OF VEHICLE SAFETY SYSTEMS IN RESPONSE TO VEHICLE ALIGNMENT CHANGES

CROSS-REFERENCE TO RELATED APPLICATIONS

The present application is related to, and claims priority from co-pending U.S. Provisional Patent Application Ser. No. 62/381,835 filed on Aug. 31, 2016, which is herein incorporated by reference.

STATEMENT REGARDING FEDERALLY SPONSORED RESEARCH

Not Applicable.

BACKGROUND OF THE INVENTION

The present application is related generally to vehicle service systems and onboard vehicle safety and monitoring systems configured to observe an environment surrounding a vehicle, and in particular, to a vehicle wheel alignment system configured to provide an operator with an indication of a need to calibrate or align one or more sensors associated with the vehicle onboard safety and monitoring systems following an adjustment to a vehicle alignment component which results in a change exceeding a tolerance to at least one vehicle alignment angle.

Figure 1:
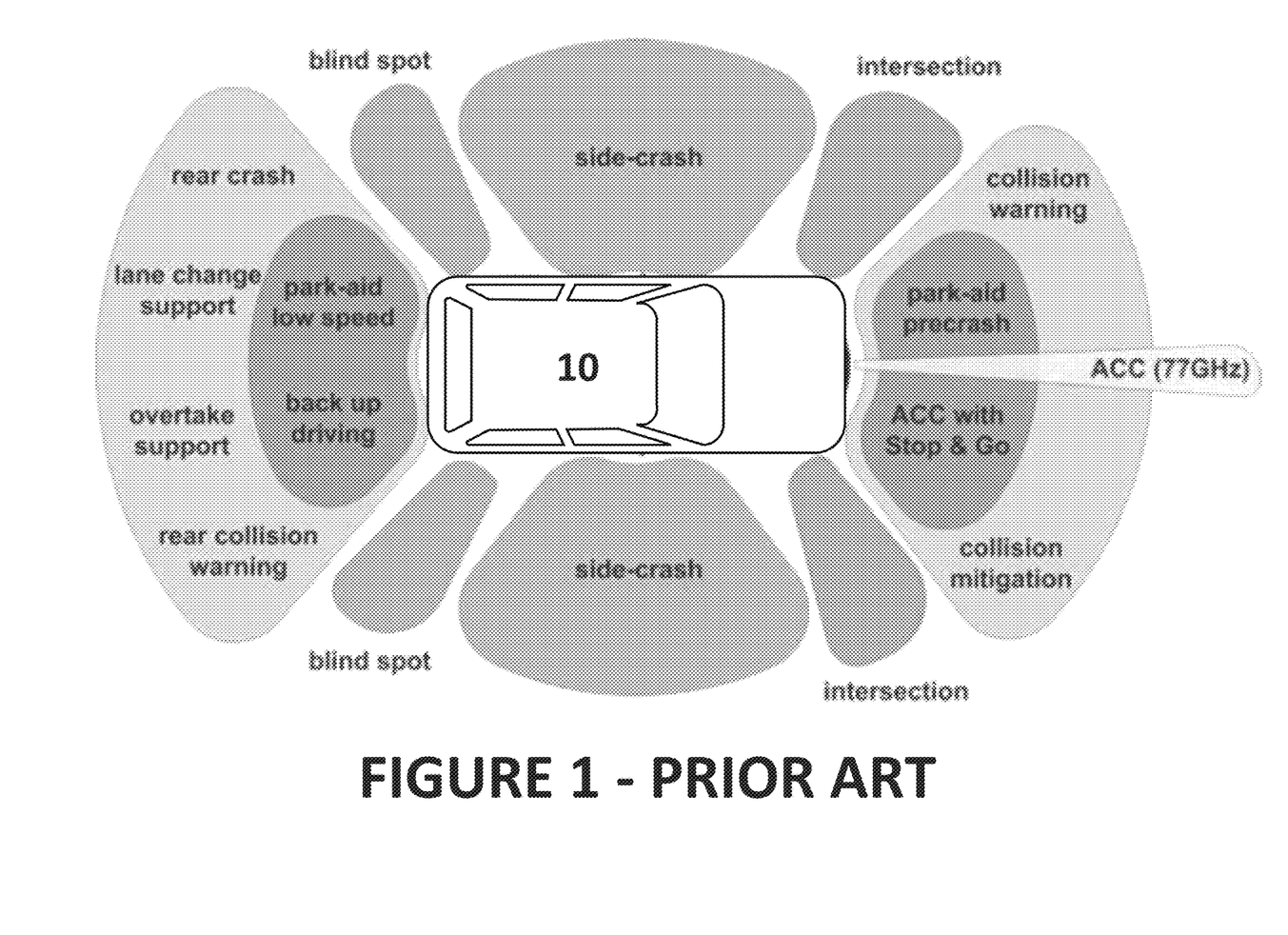
FIG. 1 is a prior art illustration of various fields of view associated with exemplary onboard vehicle sensor systems for automotive safety and auto-pilot applications.

Vehicle onboard sensor systems which are configured to observe the external environment surrounding a moving vehicle are rapidly becoming commonplace on new vehicles entering the market. These include numerous safety systems, such as forward-looking collision avoidance systems, lane departure warning systems, pedestrian avoidance systems, cross-traffic warning systems, and blind spot monitoring systems. Additional systems are associated with autonomous or semi-autonomous driving of the vehicle, such as adaptive cruise control or autopilot systems. Each of these systems, illustrated generally in FIG. 1, operates by observing or receiving data from one or more fields of view external to the vehicle, and is configured to react to objects observed or detected within those fields of view, such as the presence (or absence) of nearby vehicles, pedestrians, lane markings, curbs, street signs, etc. The various onboard sensor systems may operate in different regions of the electro-magnetic spectrum, using visible light, infrared light, LIDAR, or radar to generate images or acquire data such as range measurements.

As the autonomy of vehicles increases, accuracy of input to a primary vehicle sensor control system, or multi-domain controller, from multiple onboard sensor systems monitoring the vehicle's external environment becomes more important. In turn, it becomes critical for the primary vehicle sensor control system to successfully combine together tracking information from multiple sensor for various observed objects or features in order to provide meaningful tracking data for the objects or features in the environment around the vehicle. By further combining the tracking information with mapping and navigation data, the primary vehicle sensor control system can make or confirm decisions on vehicle movements or interactions with the surrounding environment. Combining the tracking information from multiple sensors further enables the primary vehicle sensor control system to maintain functionality in the event one or more of the onboard sensor systems becomes inoperable or impaired, such as due to snow or rain obscuring a field of view. However, it is necessary to ensure that input provided to the primary vehicle sensor control system from each onboard sensor is combined within a common spatial frame of reference and based on a common temporal reference, enabling the primary vehicle sensor control system to establish a comprehensive determination for the positions and movements of the observed objects relative to the vehicle's direction of travel.

The process of combining data within the primary vehicle sensor control system begins with receipt of the information from each vehicle onboard sensor. The primary vehicle sensor control system next determines when two or more sensors are observing the same object, and integrates the associated information into a common or fused track for the object in a common spatial and temporal reference frame associated with a body center point or centerline of the vehicle. Integrating the input from multiple onboard vehicle sensors into fused tracks for objects within a common spatial reference frame provides the primary vehicle sensor control system with a unified environment in which to detect potential hazards, collisions, or other threats to the vehicle.

Some vehicle onboard sensors (and/or primary vehicle control systems) incorporate self-learning or self-calibration features which enable them to accommodate small changes in the tracking of the vehicle in motion, relative to the vehicle body centerline, which occur gradually over time during vehicle operation. However, when a vehicle undergoes a wheel alignment service procedure, changes in one or more alignment angles made during the service procedure may alter the tracking of the vehicle by an amount which is greater than, or more sudden than, that which can be automatically corrected for or compensated for by the self-learning or self-calibration features of the vehicle onboard sensors or primary vehicle sensor control system.

In response, vehicle manufacturers will often require a complete recalibration or realignment of the vehicle onboard sensors and primary vehicle sensor control system following any changes to the vehicle wheel alignment characteristics. The procedures required for recalibration or realignment of the vehicle onboard sensors and/or primary vehicle sensor control system can be time consuming, space intensive, and may require one or more vehicle test drives.

Accordingly, there is a need to provide a vehicle service system, such as a vehicle wheel alignment system, with a procedure to generate a suitable warning or indication when changes in one or more alignment angles made during the service procedure alter a vehicle characteristic, such as tracking, by an amount which is greater than that which can be automatically corrected for, or compensated for, by the self-learning or self-calibration features of the vehicle onboard sensors or primary vehicle sensor control system, enabling an operator to avoid the need to carry out recalibration or realignment of the vehicle onboard sensors and/or primary vehicle sensor control system following adjustments to vehicle wheel alignment characteristics which will not impact the performance of these systems.

BRIEF SUMMARY OF THE INVENTION

Briefly stated, an embodiment of the present invention is a vehicle service system, such as a wheel alignment system, configured to generate a suitable warning or indication to an operator when changes in one or more alignment angles made (or required to be made) during an ongoing vehicle service procedure alter (or will alter) a vehicle alignment characteristic, such as a thrust line or thrust angle, by an amount which is greater than that which can be automatically corrected for, or compensated for, by a self-learning or self-calibration features of one or more vehicle onboard sensors or by a primary vehicle sensor control system.

In another embodiment of the present invention is a vehicle service system, such as a wheel alignment system, configured to identify when changes in one or more alignment angles made (or required to be made) during an ongoing vehicle wheel alignment procedure alter (or will alter) a vehicle alignment characteristic, such as a thrust line or thrust angle, by an amount which is within a range which can be automatically corrected for, or compensated for, by a self-learning or self-calibration features of one or more vehicle onboard sensors or by a primary vehicle sensor control system. Responsive to such an identification, the ongoing vehicle wheel alignment procedure is altered by the vehicle service system to selectively bypass steps intended to carry out recalibration or realignment of the vehicle onboard sensors and/or primary vehicle sensor control system.

In a further embodiment of the present disclosure, a vehicle service system, such as a wheel alignment system, is configured to modify an ongoing vehicle service procedure to include at least one realignment or recalibration procedure for a vehicle onboard sensor or primary vehicle sensor control system when either a procedure requires a change in one or more alignment angles, or a sensor measures a change made in one or more alignment angles, during the ongoing vehicle service procedure which alters a vehicle characteristic, such as a thrust line or thrust angle, by an amount which is greater than that which can be automatically corrected for, or compensated for, by the self-learning or self-calibration features of the vehicle onboard sensors or primary vehicle sensor control system.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
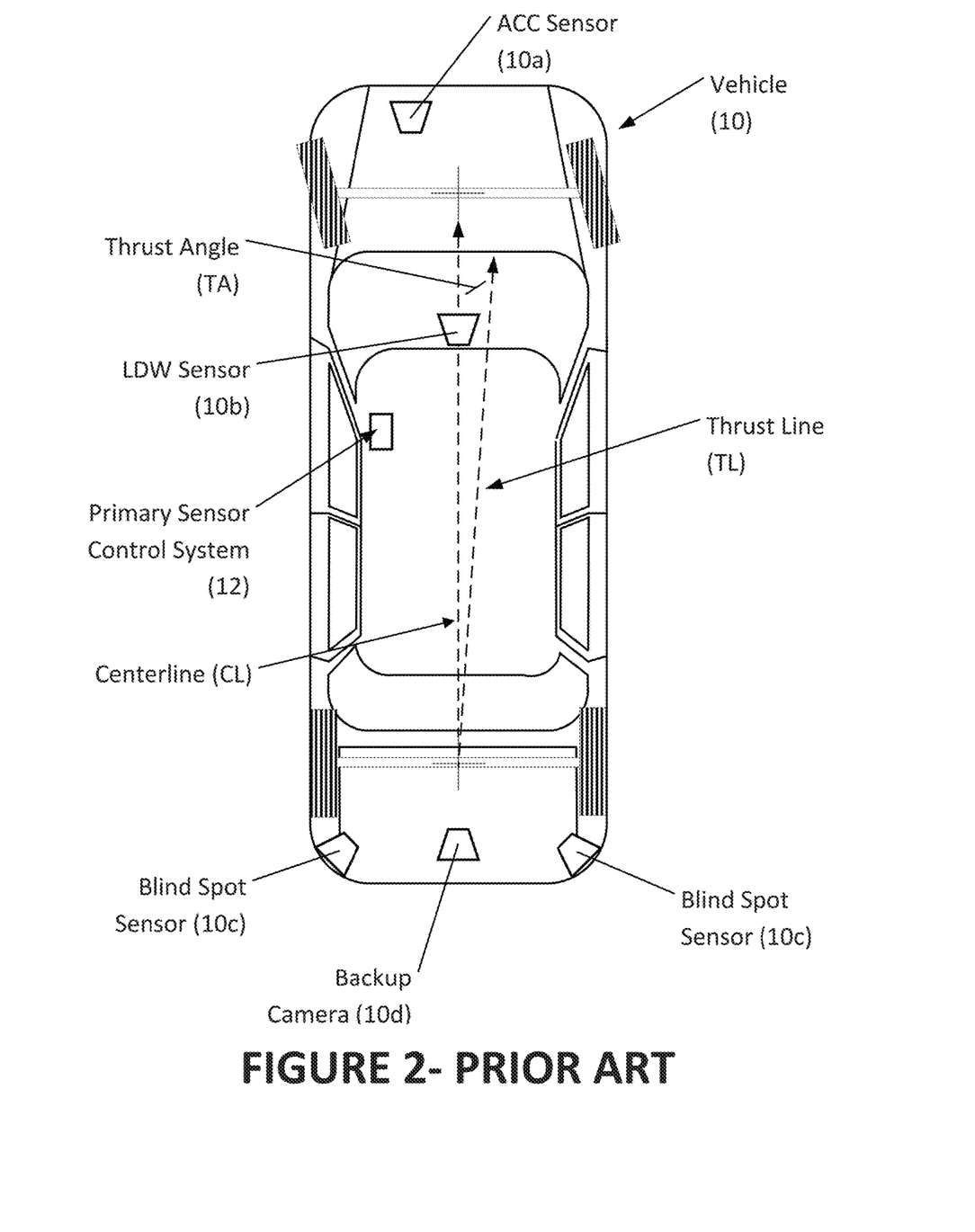
FIG. 2 is a top plan view of a prior art vehicle, illustrating exemplary placement of onboard sensor systems, a centerline, and a thrust line offset from the centerline by a thrust angle (exaggerated for illustration purposes)
Figure 3:
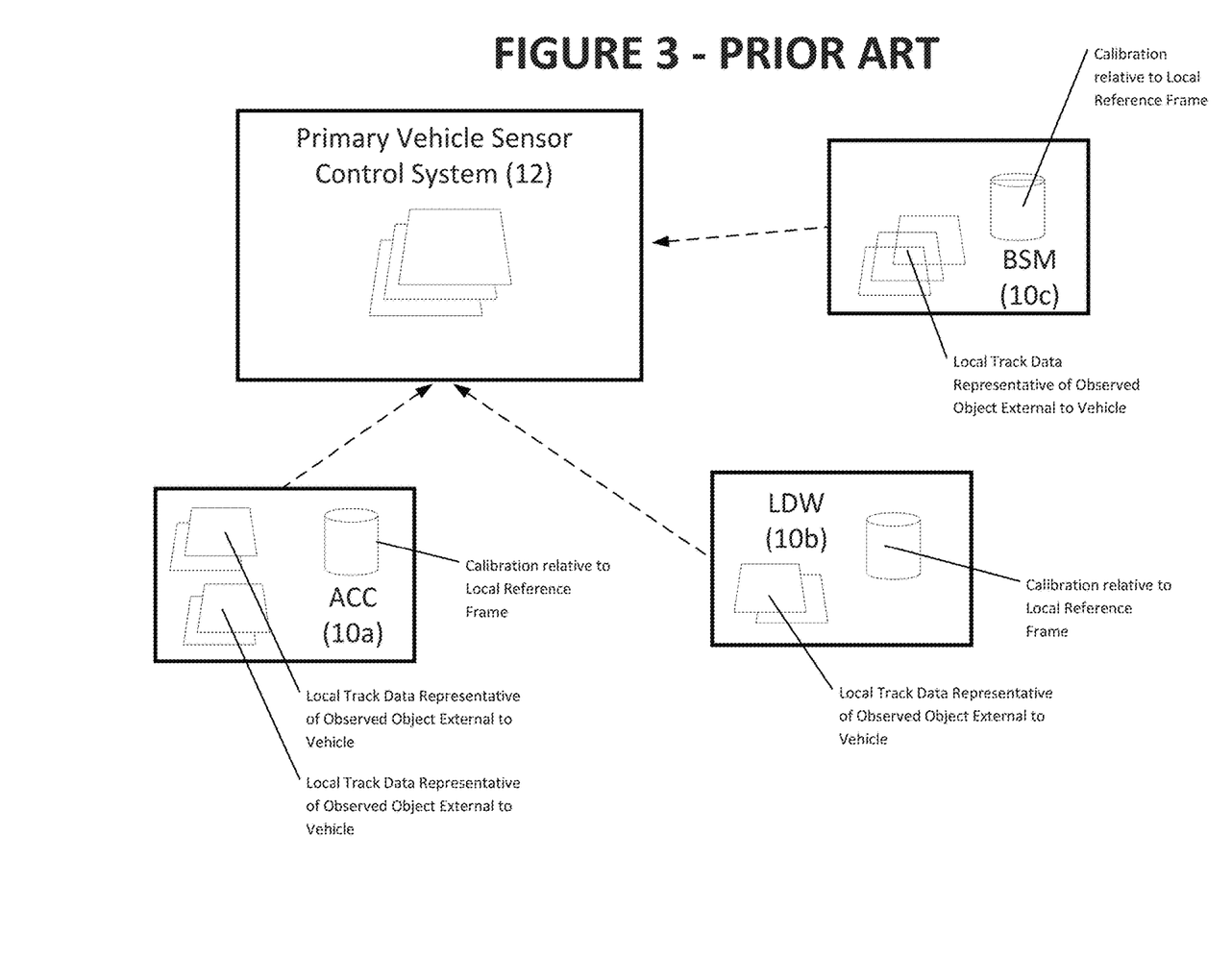
FIG. 3 is a block diagram representing the prior art interaction of several onboard vehicle sensor systems with a primary vehicle sensor control system for tracking objects external to the vehicle.
Figure 4:
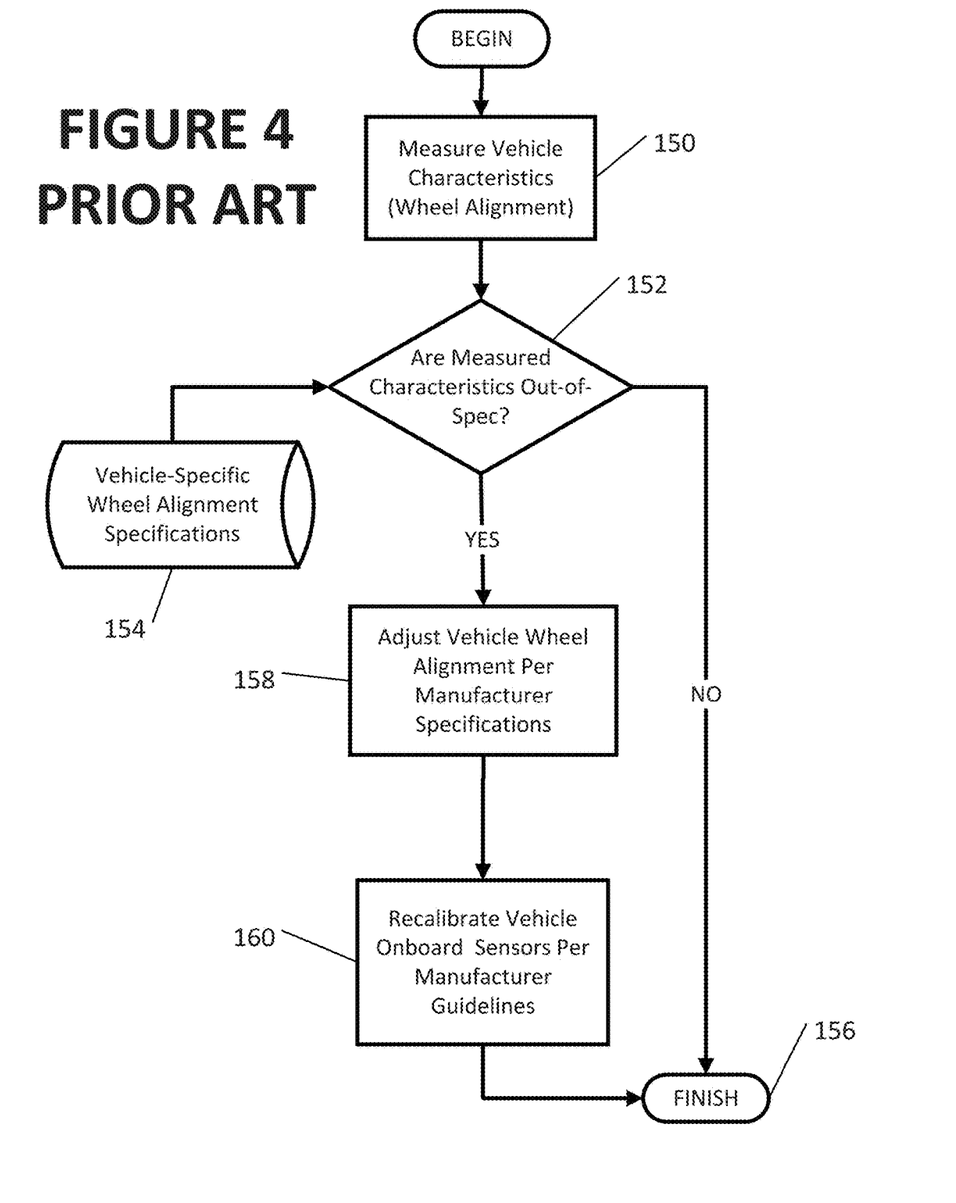
FIG. 4 is a flow chart representing a prior art procedure for measuring and aligning a vehicle equipped with onboard safety system sensors.

With reference to the several figures, and to FIG. 2-4 in particular, a vehicle 10 is shown in which one or more onboard sensor systems 10a-10d, are configured to observe an external environment in proximity to the vehicle 10 in order to detect the presence of nearby objects or road features. Each onboard sensor system 10a-10d is initially calibrated according to manufacturer guidelines in a position and/or orientation which is relative to a selected vehicle-centric spatial reference, such as a component of the vehicle body, to a centerline (CL) of the vehicle, to a thrust line (TL), or a thrust angle (TA) of the vehicle. It will be understood that the terms thrust line (TL) and thrust angle (TA) are different ways of identifying the same vehicle-centric spatial reference, and as such can be interchanged by one of ordinary skill in the art of wheel alignment.

Data acquired by the onboard sensor systems which is associated with the relative position of, and optionally the relative motion of, an observed or detected external object or roadway feature is initially processed to establish a representation to the object or feature's path, trajectory or track relative to the observing onboard sensor 10a-10d. These representations are referred to as local tracks, and are established either directly by each observing onboard sensor system 10a-10d, or indirectly at a primary vehicle sensor control system 12 from observation data conveyed from the various onboard sensor systems 10a-10d, such as shown in U.S. Pat. No. 7,337,650 B1 to Preston et al.

When two or more local tracks of data representative of an object observed or detected by multiple onboard sensor systems 10a-10d are available to the primary vehicle sensor control system 12, the local tracks may be further evaluated by the primary vehicle sensor control system 12 to generate a single unified representation of the object's position and/or movement within a common spatial frame of reference. This evaluation results in a unified representation of the object's position and/or motion. The consolidation of local track data from multiple observation sources into a unified representation for the observed object, enables the primary vehicle sensor control system 12 to respond to the object in an appropriate manner (i.e., collision avoidance, path prediction, etc.) for objects in proximity to the vehicle 10.

During normal operation in some vehicles 10, small changes in the relative alignment of the individual onboard sensor systems 10a-10d (such as to either the vehicle centerline (CL) or to the vehicle thrust angle (TA)) are accommodated by self-correcting or self-learning algorithms, ensuring that accurate data is conveyed to the primary vehicle sensor control system 12. These small changes may be the result of vehicle component wear, changes in vehicle wheel alignment over time, or sensor calibration drift due to environmental conditions. For example, as a vehicle 10 ages, components such as tires and suspension elements can wear or become damaged, causing the thrust angle (TA) (the direction in which it travels when steered straight) to deviate from the actual centerline (CL) of the vehicle, such as shown in FIG. 2. If the change is gradual, over an extended period of time, self-adjusting onboard sensor systems 10a-10d will adjust to the offset of the thrust line (TL) or changes in thrust angle (TA), ensuring that they are observing or monitoring the vehicle's actual path of travel. However, the amount of self-correction of self-learning which onboard sensor systems 10a-10d can accommodate is in some cases limited, and often requires a period of time during which the sensor "learns" the new orientation. When a vehicle 10 undergoes an alignment adjustment, and in particular, an alignment adjustment which abruptly alters the thrust angle (TA) by an amount which is greater than the limits of the self-adjusting features of the various onboard sensor systems 10a-10d, a manual recalibration or realignment of the onboard sensor systems 10a-10d is required in order to bring the onboard sensor systems into alignment with the new thrust angle (TA).

In response, vehicle manufacturers require a complete recalibration or realignment of the vehicle onboard sensors and primary vehicle sensor control system following any changes to the vehicle wheel alignment characteristics, as illustrated in FIG. 4. The procedures begin with measurement of the vehicle wheel alignment characteristics (Box 150). The measured wheel alignment characteristics are then evaluated (Box 152) against manufacturer tolerances and specifications, as recalled from a database (Box 154). If the measured wheel alignment characteristics are within tolerance, no adjustments to the vehicle are required, and the process is complete. However, if any of the measured wheel alignment characteristics are outside of the specification tolerances, adjustments to the vehicle characteristics are made per manufacturer guidelines (Box 158). Following any adjustment to the vehicle characteristics, the vehicle onboard sensors are adjusted relative to the vehicle per the manufacturer guidelines (Box 160).

Figure 5:
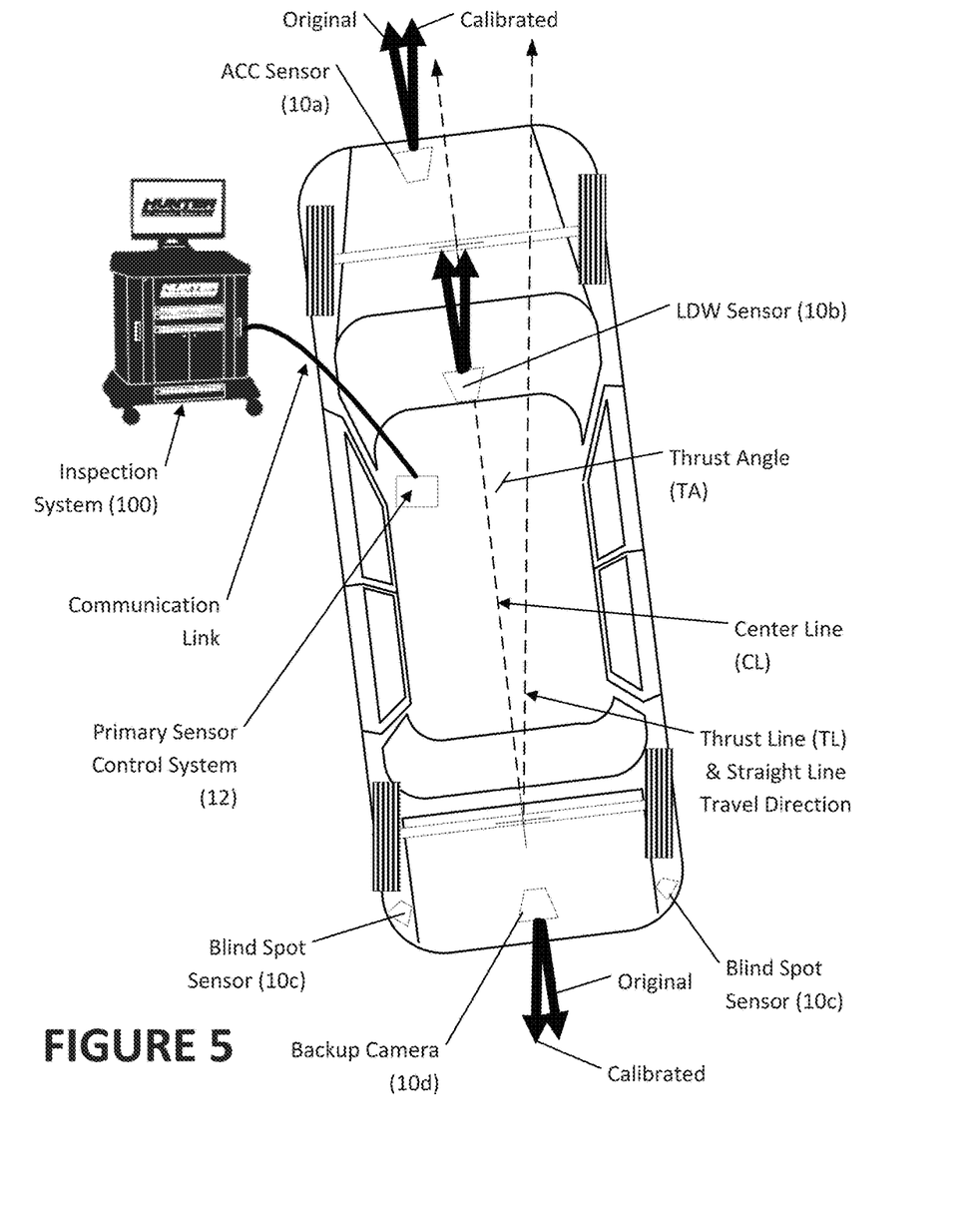
FIG. 5 illustrates a vehicle in communication with a vehicle wheel alignment measurement or inspection system and emphasizes the differences between onboard sensor systems aligned to a vehicle centerline and onboard sensor systems aligned to a vehicle thrust line diverging from the vehicle centerline due to wheel alignment issues (angles have been exaggerated for clarity)
Figure 6:
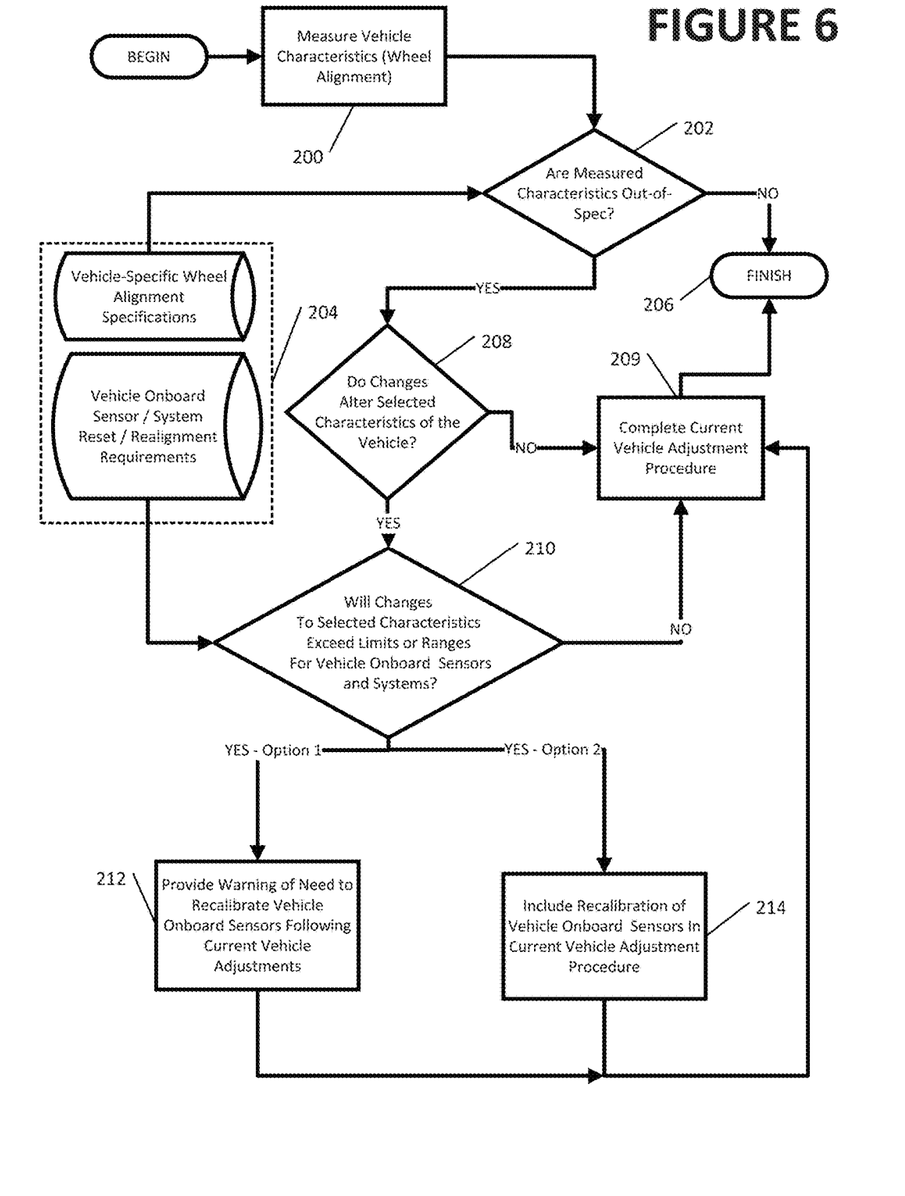
FIG. 6 is a flow chart representing a procedure of the present disclosure.

Turning to FIGS. 5 and 6, in a first embodiment of the present invention a vehicle alignment system 100, such as the Hawkeye Elite™ Alignment system manufactured and sold by Hunter Engineering Company of St. Louis, Mo., and used to measure vehicle wheel alignment characteristics such as toe angles, camber angles, and thrust line parameters, is configured to simplify the vehicle wheel alignment process on vehicles having onboard safety system sensors 10a-10d or control system 12. The system 100 evaluates the measured vehicle characteristics, and generating suitable warnings or indications to an operator as to the need to adjust the vehicle onboard safety system sensors 10a-10d or control system 12 only when changes or adjustments required to be made to the vehicle 10 during an ongoing service procedure will alter a selected vehicle characteristic, such as tracking, or thrust angle (TA), by an amount which is greater than that which can be automatically corrected for, or compensated for, by the self-adjusting features of the vehicle onboard sensors 10a-10d or primary vehicle sensor control system 12, or by an amount which exceeds a predetermined change limit associated with selected vehicle characteristic. If changes or adjustments required to be made to the vehicle 10 during the ongoing service procedure will not alter the selected vehicle characteristic, or the selected vehicle characteristic remains within an acceptable tolerance range, the procedure can be completed without requiring adjustment of the vehicle onboard safety system sensors 10a-10d or control system 12, and any such steps included in the procedure can be bypassed.

Initially as shown in FIG. 6, various vehicle characteristics, such as wheel alignment angles, are measured (Box 200) by the vehicle service or inspection system and evaluated to determine if they are out of specification tolerances (Box 202). If these measured characteristics are not outside of the required specification tolerances ("NO"), based on data retrieved from a suitable database (Box 204), manually entered, or otherwise available to the vehicle service or inspection system 100, no further steps are required, and the procedure is terminated (Box 206). If, however, adjustments or changes to the vehicle are required to bring one or more of the measured characteristics to within an acceptable tolerance of a required specification ("YES"), the required adjustments or changes are reviewed (Box 208) to determine if they will alter one or more selected characteristics of the vehicle, such as tracking or thrust angle (TA) which are associated with the vehicle onboard safety system sensors 10a-10d or control system 12. In order to determine if a required change or adjustment to the vehicle alters (or will alter) a vehicle characteristic by an amount sufficient to require realignment or recalibration of one or more of the vehicle onboard sensors, the vehicle service system recalls data defining associated limits for various vehicle characteristics and for vehicle onboard sensors 10a-10b or control system 12 readjustments. The associated data can be in a variety of formats, and may be obtained from a suitable database, electronic data store, or manual input available to the vehicle service system 100, including the database (Box 204) containing vehicle-specific wheel alignment specifications. For example, the associated data may consist of either generic or vehicle-specific limits setting forth a maximum permissible change in one or more relevant vehicle characteristics, after which an adjustment of a vehicle onboard sensor is required. In the event the required adjustments or changes will not alter the selected characteristics of the vehicle, the vehicle adjustment procedure is completed (Box 209), and the process finished (Box 206).

If it is determined (Box 208) that the required adjustments or changes will alter the selected characteristics of the vehicle associated with the vehicle onboard safety system sensors 10a-10d or control system 12, the changes are evaluated to determine if the selected characteristics of the vehicle will be changed by amounts which exceed limits or ranges established for the onboard vehicle safety system sensors or control system (Box 210). Changes which are within acceptable limits or ranges are carried out during completion of the current vehicle adjustment procedure (Box 209), and the process completed (Box 206).

Where the changes to the selected characteristics of the vehicle fall outside of the acceptable limits or ranges, two options are available. Under Option 1, a warning is provided to an operator (Box 212) of the need to carry out a suitable realignment or recalibration procedure for the vehicle onboard safety system sensors 10a-10d or control system 12 following completion of the current vehicle adjustment procedure (Box 209). Alternatively, under Option 2, additional procedures for realignment or recalibration of the vehicle onboard sensors or control system are automatically incorporated into the current vehicle service procedure (Box 214), with our without specific notification to an operator, and the current procedure is then completed (Box 209).

When provided, the warning or notification to the operator (Box 212) indicates that an amount of change required to bring a relevant vehicle characteristic to within a specification limit will exceed the maximum permissible amount, or falls outside of a permissible range. Suitable warnings or indications may be in a variety of formats, including text and/or graphical representations presented on a display screen associated with the vehicle service system, or incorporated into a printed or electronically generated summary or report.

Alternatively, or in conjunction with a provided warning, the vehicle service system 100 is configured to modify, or to append, an ongoing vehicle service procedure (Box 214). The modified or appended procedure may include at least one realignment or recalibration procedure for a vehicle onboard sensor 10a-10d or primary vehicle sensor control system 12 responsive to changes or adjustment to vehicle characteristics made (or which will be made) during the vehicle service procedure which alter (or which will alter) a vehicle characteristic, such as tracking or thrust angle (TA), by an amount which is greater than that which can be automatically corrected for, or compensated for, by the self-adjusting features, or which exceeds an established limit or tolerance (Box 210). The modification of the ongoing vehicle service procedure (Box 214) may be "silent", such that added steps required to complete the vehicle service procedure are simply incorporated into the workflow in a manner which appears seamless to the operator, or the operator may be provided with appropriate notices and/or confirmations.

Once the ongoing vehicle service procedure has been appended or modified, the procedure is completed (Box 209) in a conventional manner.

Figure 7:
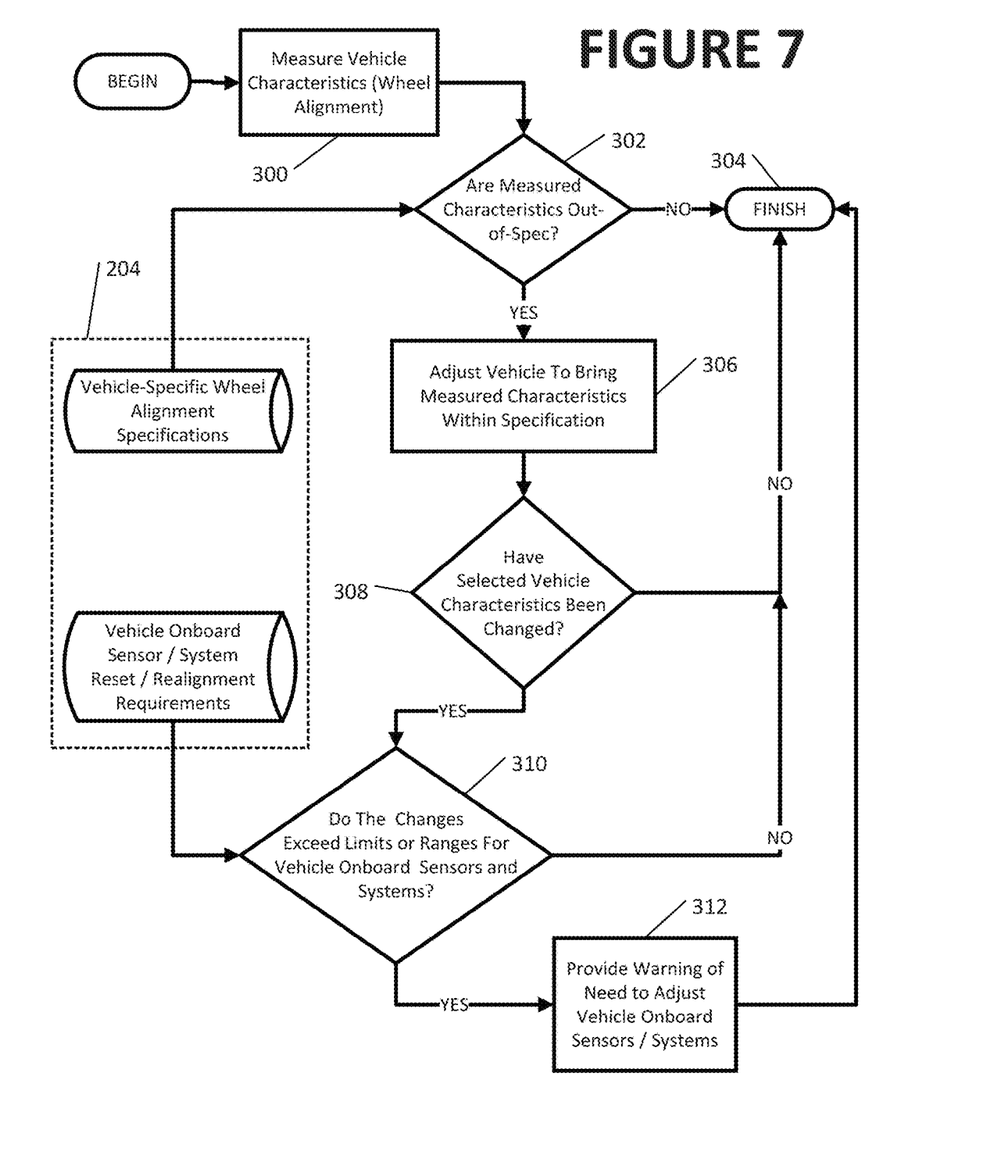
FIG. 7 is a flow chart representing an alternate procedure of the present disclosure.

In an alternative embodiment illustrated in FIG. 7, the vehicle alignment system 100, used to measure vehicle characteristics such as toe angles, camber angles, and thrust line parameters, is configured to generate a suitable warning or indication to an operator when changes or adjustments made to the vehicle 10 during an ongoing service procedure alter a vehicle characteristic, such as tracking or thrust angle (TA), by an amount which is greater than that which can be automatically corrected for, or compensated for, by the self-adjusting features of the vehicle onboard sensors 10a-10d or primary vehicle sensor control system 12, or by an amount which exceeds a predetermined change limit associated with the thrust angle (TA), such as may be established by a vehicle manufacturer.

Initially, various vehicle characteristics, such as wheel alignment angles, are measured (Box 300) by the vehicle service or inspection system and evaluated to determine if they are out of specification tolerances (Box 302). If these measured characteristics are not outside of the required specification tolerances ("NO"), based on data retrieved from the database (Box 204), manually entered, or otherwise available to the vehicle service or inspection system 100, no further steps are required, and the procedure is terminated (Box 304). If, however, adjustments to the vehicle are required to bring one or more of the measured characteristics to within an acceptable tolerance of a required specification ("YES"), the adjustments are completed as required (Box 306). Following the completion of the adjustments, an additional review is conducted (Box 308) to determine if the completed adjustments to the vehicle resulted in changes to selected characteristics of the vehicle (Box 308) which are associated with the vehicle onboard sensors 10a-10d or primary vehicle sensor control system 12. If these vehicle characteristics remain unchanged following the completed adjustments to the vehicle, ("NO"), no further action is required, and the procedure is terminated (Box 304).

When a selected characteristic of the vehicle is changed or altered during the vehicle adjustments (Box 308—"YES"), a further evaluation is required (Box 310) to determine if the change has exceeded limits or ranges of permissible adjustments for that characteristic associated with the vehicle onboard sensors 10a-10d or primary vehicle control system 12. In order to determine if the changes to the selected vehicle characteristic are sufficient to require readjustment of one or more of the vehicle onboard sensors 10a-10d, the vehicle service system recalls data defining associated limits for realignments, resets, or recalibrations associated with the vehicle onboard sensors 10a-10b or control system 12. The associated data can be in a variety of formats, and may be obtained from a suitable database, electronic data store, or manual input available to the vehicle service system 100, including the database (Box 204) containing vehicle-specific wheel alignment specifications. For example, the associated data may consist of either generic or vehicle-specific limits setting forth a maximum permissible change in one or more relevant vehicle characteristics, after which an adjustment of a vehicle onboard sensor is required.

If a required change does not exceed the limits or ranges established by the associated data for requiring an adjustment of one or more of the vehicle onboard sensors or control system ("NO"), no further action is required with respect to the vehicle onboard sensors or control system, and the procedure terminates (Box 304). However, if the change or adjustment exceeds the limit or range ("YES"), the procedure provides a warning to an operator (Box 312) indicating that the changes or adjustments to the relevant vehicle characteristic exceeded a maximum permissible amount, or fall outside of a permissible range associated with the vehicle onboard sensors 10a-10d or primary vehicle control system 12. Suitable warnings or indications may be in a variety of formats, including text and/or graphical representations presented on a display screen associated with the vehicle service system, or incorporated into a printed or electronically generated summary or report. Once the warning is provided, the procedure is terminated (Box 304).

Figure 8:
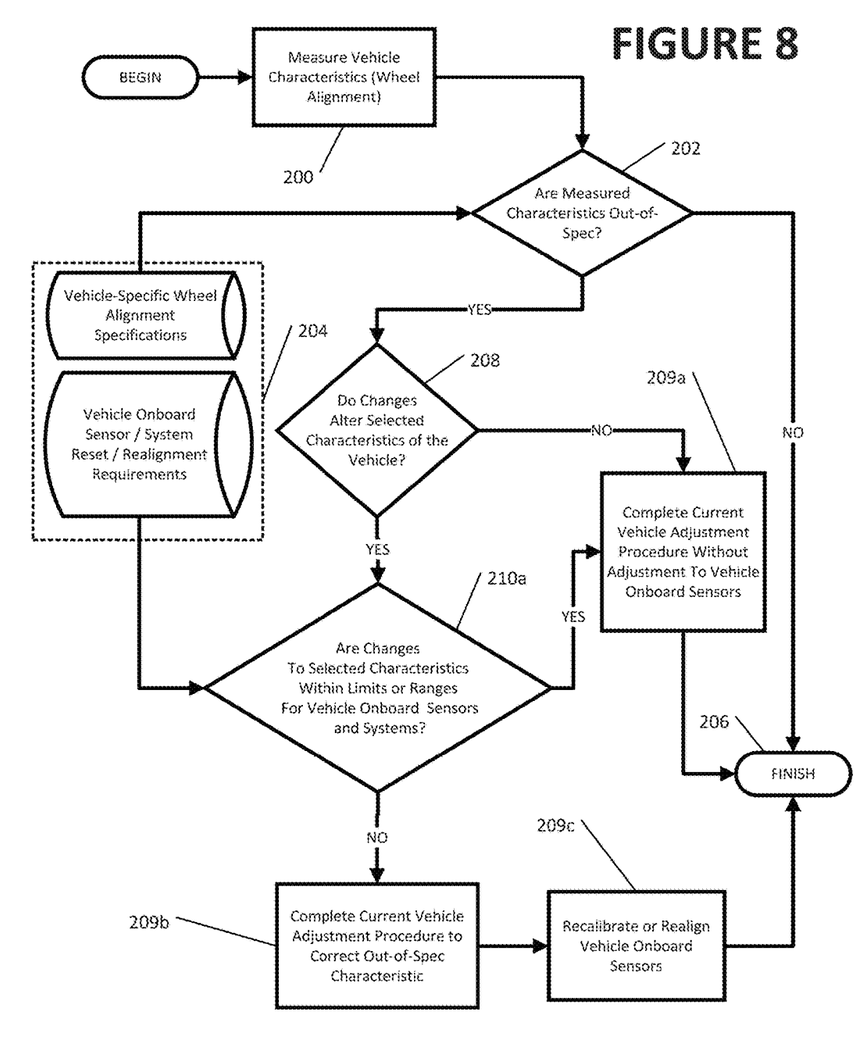
FIG. 8 is a flow chart representing another alternate procedure of the present disclosure.

In a further embodiment of the present invention, conventional vehicle adjustment procedures, such as shown in FIG. 4, are modified as illustrated in FIG. 8 to remove or bypass steps intended to carry out realignment or recalibration of vehicle onboard sensors 10a-10d or a primary vehicle control system 12 in response to an evaluation of selected changes made, or to be made, to characteristics of the vehicle such as the tracking or thrust angle (TA). For example, the vehicle service system, such as a wheel alignment system, is configured to identify (Box 210a) when changes in one or more alignment angles made (or required to be made) during an ongoing vehicle wheel alignment procedure alter (or will alter) a selected vehicle alignment characteristic, such as a thrust line or thrust angle, by an amount which is within the limits or ranges which can be automatically corrected for, or compensated for, by a self-adjusting features of one or more vehicle onboard sensors 10a-10d or by a primary vehicle sensor control system 12. Responsive to such a condition, the ongoing vehicle wheel alignment procedure is completed by the vehicle service system (Box 209*a*) while selectively bypassing or skilling steps intended to carry out an adjustment of the vehicle onboard sensors and/or primary vehicle sensor control system. If the condition is not met, i.e. the changes to the selected characteristics of the vehicle will exceed the limits or ranges, the current vehicle wheel alignment procedure required to correct the out-of-spec characteristics of the vehicle is completed, (Box 209*b*), followed by (or including) a procedure for recalibrating the vehicle onboard sensors (Box 209*c*).

While the aforementioned embodiments have been described in the context of a wheel alignment system 100, it will be understood that the procedures described may be utilized with other vehicle service systems, such as the Quick Check™ vehicle inspection system manufactured and sold by Hunter Engineering Company of St. Louis, Mo.

The present disclosure can be embodied in-part in the form of computer-implemented processes and apparatuses for practicing those processes. The present disclosure can also be embodied, in-part, in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied, in-part, in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An improved vehicle service or inspection system, comprising:
    a processing system configured with software instructions to receive data representative of a measure at least one wheel alignment characteristic of a vehicle configured with at least one onboard vehicle safety system sensor;
    wherein said processing system is further configured with software instructions to generate an indication to an operator when a change to said at least one wheel alignment characteristic alters a thrust angle of the vehicle by an amount which either:
        i. exceeds a self-adjustment limit associated with said at least one onboard vehicle safety system sensor for responding to changes in an alignment characteristic of the vehicle, or
        ii. exceeds an established limit for an amount of change associated with said thrust angle; and
    wherein said processing system is further configured with software instructions to generate an output to an operator of a need to recalibrate said at least one onboard sensor when said change or adjustment to the at least one wheel alignment characteristic alters the thrust angle by an amount which exceeds at least one of said limits.

2. The improved vehicle service or inspection system of claim 1 wherein said processing system is further configured with software instructions to alter an ongoing vehicle service procedure to include a process for recalibrating said at least one onboard vehicle safety system sensor when said change to the at least one wheel alignment characteristic alters the thrust angle by an amount which exceeds at least one of said limits.

3. The improved vehicle service or inspection system of claim 1 wherein said processing system is configured to retrieve data representative of at least one of said limits associated with said at least one onboard vehicle safety system sensor from an accessible database of vehicle-specific data.

4. The improved vehicle service or inspection system of claim 1 wherein said processing system is further configured with software instructions to respond to said change to the at least one wheel alignment characteristic, to alter an ongoing vehicle service procedure to bypass any included steps for adjusting said at least one onboard vehicle safety system sensor when said change or adjustment alters the thrust angle by an amount which is below each of said limits.

5. An improved service or inspection system for vehicles having at least one vehicle onboard safety system sensor aligned or calibrated relative to at least one selected alignment characteristic of the vehicle following a vehicle service procedure altering at least one alignment characteristic of the vehicle, the improvement comprising:
    a processing system configured with software instructions to receive measurement data from a plurality of measurement sensors, said measurement data representative of a plurality of alignment characteristics of the vehicle, said plurality of alignment characteristics including said at least one selected alignment characteristic;
    evaluating, with said processing system, said measurement data, to determine if adjustments to said vehicle are required during said vehicle service procedure to alter at least one of said alignment characteristics to meet an associated specification;
    wherein said processing system is configured with software instructions responsive to a determination of required adjustments, to predict changes to said selected alignment characteristic of the vehicle resulting from vehicle adjustments required by said vehicle service procedure; and
    wherein said processing system is further configured with software instructions to alter said vehicle service procedure in response to said predicted changes to bypass steps or procedures for adjusting said at least one vehicle onboard safety system sensor when said predicted changes to said selected alignment characteristic are within limits associated with said at least one onboard vehicle safety system sensor.

6. The improved vehicle service or inspection system of claim 5 wherein said selected alignment characteristic of the vehicle is one of a thrust line or a thrust angle.

7. A method for inspecting an alignment characteristic of a vehicle having at least one onboard vehicle safety system sensor configured to self-adjust in response to a limited change to an alignment characteristic of the vehicle, comprising:
    acquiring measurement data associated with said alignment characteristic of the vehicle from an alignment measurement sensor;
    evaluating said acquired measurement data in a processing system relative to a specification value recalled from a specification database to determine if a change in said alignment characteristic is required to bring said alignment characteristic to within an acceptable tolerance of said specification value;

responsive to a determination of a required change, further determining if a required amount of said change in said alignment characteristic exceeds either:
  i. a limit associated with said onboard vehicle safety system sensor self-adjusting functionality, or
  ii. an established limit for a change associated with said alignment characteristic, and responsive to said determination of said required amount of change exceeding either limit, providing an indication to an operator conveying a need for adjustment of said onboard vehicle safety system sensor in association with a vehicle service procedure for adjusting one or more components of said vehicle to impart said required amount of change to said alignment characteristic.

8. The method of claim 7 further including the step of amending said vehicle service procedure to incorporate one or more steps required to adjust said onboard vehicle safety sensor in response to said required amount of change for said alignment characteristic exceeding at least one of said limits.

9. The method of claim 7 wherein said alignment characteristic is one of a thrust line or a thrust angle.

10. The method of claim 7 wherein responsive to said determination of said required amount of change being less than each limit, amending said vehicle service procedure to bypass any steps included to adjust said onboard vehicle safety sensor.

11. A method for servicing a vehicle having at least one onboard vehicle safety system sensor, comprising:
  operating a vehicle wheel alignment measurement system to acquire measurement data associated with a plurality of wheel alignment characteristics of the vehicle;
  evaluating said acquired measurement data in a processing system to determine if any of said plurality of wheel alignment characteristics of the vehicle are not within a tolerance of an associated specification value;
  responsive to at least one wheel alignment characteristic of the vehicle outside of said tolerance, determining, if an adjustment to the vehicle required to bring said at least one wheel alignment characteristic within said tolerance will alter a thrust line or a thrust angle of the vehicle; and
  selecting a procedure for adjusting the vehicle which includes or excludes a process for aligning or calibrating said at least one onboard vehicle safety system sensor in response to said determination.

12. The method of claim 11 where said procedure is selected to include said process for aligning or calibrating said at least one onboard vehicle safety system sensor in response to said determination establishing that said adjustment to the vehicle will alter said thrust line or said thrust angle of the vehicle.

13. The method of claim 11 where said procedure is selected to exclude said process for aligning or calibrating said at least one onboard vehicle safety system sensor in response to said determination establishing that said adjustment to the vehicle will not alter said thrust line or said thrust angle of the vehicle.

14. The method of claim 11 where said procedure is selected to exclude said process for aligning or calibrating said at least one onboard vehicle safety system sensor in response to said determination establishing that said adjustment to the vehicle will alter said thrust line or said thrust angle of the vehicle by an amount which is less than a threshold associated with said onboard vehicle safety system sensor self-alignment or self-calibration functionality.

* * * * *